United States Patent [19]

Brandstetter

[11] 4,141,245
[45] Feb. 27, 1979

[54] DEVICE FOR THE MEASUREMENT OF MECHANICAL WORK AND POWER

[76] Inventor: Heinz P. Brandstetter, Nietzschestrasse 15, 8000 Munich 40, Fed. Rep. of Germany

[21] Appl. No.: 690,580

[22] Filed: May 27, 1976

[30] Foreign Application Priority Data

Jun. 3, 1975 [DE] Fed. Rep. of Germany ....... 2524605

[51] Int. Cl.² .............................................. G01L 5/06
[52] U.S. Cl. ...................................... 73/144; 73/490; 74/227; 74/242.11 C
[58] Field of Search ................ 73/112, 133 R, 136 R, 73/143–144, 490, 529; 74/227, 242.15 R, 242.11 C, DIG. 7

[56] References Cited

U.S. PATENT DOCUMENTS

| | | | |
|---|---|---|---|
| 1,795,623 | 3/1931 | Thompson et al. | 73/144 |
| 2,131,868 | 10/1938 | Bolton et al. | 73/144 X |
| 2,310,597 | 2/1943 | Raphael | 73/144 |
| 2,700,302 | 1/1955 | Decker | 73/144 X |
| 3,177,708 | 4/1965 | Saxl | 73/144 |
| 3,382,713 | 5/1968 | Chutter | 73/133 X |
| 3,403,546 | 10/1968 | Stratton | 73/144 X |
| 3,494,183 | 2/1970 | Sokolosky | 73/144 |
| 3,608,371 | 9/1971 | Kessler | 73/144 |
| 3,832,899 | 9/1974 | Nicolav | 73/144 |

*Primary Examiner*—Richard C. Queisser
*Assistant Examiner*—Charles Gorenstein
*Attorney, Agent, or Firm*—Jerry Cohen

[57] ABSTRACT

Mechanical work and power transmitted through transmission elements such as chain drives is determined by deflecting a transmission element and measuring the distance and/or speed of deflection and the deflection force while the transmission continues its operation.

6 Claims, 20 Drawing Figures

DEVICE FOR THE MEASUREMENT OF MECHANICAL WORK AND POWER

BACKGROUND OF THE INVENTION

The invention relates to measurement of mechanical work and power, which is transmitted by flexible transmission elements such as chains, V belts, flat belts, cables, etc.

It is an important object of the invention to provide a device which is simple in its construction and which in particular, can be introduced at any time as an addition to the transmission element essentially without influencing the process of force transmission.

SUMMARY OF THE INVENTION

According to the invention, a device for measuring mechanical work and power is provided which comprises force means, deflecting the transmission elements which is the subject of work and power measurement. The force means are used together with means for measurement of the deflection or of the force resulting from the deflection; means for measuring the distance covered by the transmission elements and the speed of the transmission element; and means for determining and summarizing the product of force times distance or force times speed, to determine the traction in the transmission elements.

The measurement approach utilized in the invention is based on determination of the traction in the transmission element, the distance and the speed of the transmission element, and on the combining of these factors.

The force means serving to determine the force in the transmission element preferably comprise a loaded roller (placed under a spring weight or a cylinder load, e.g., of a pneumatic cylinder), which presses against it in order to deflect it. The deflection is a measurement of traction in the transmission element. The distance and the speed of the transmission element are measured via a wheel driven by the transmission element or a driven roller, whereby, according to the invention, the roller of the force means or a counter-roller can serve simultaneously for measuring the distance and speed of the transmission element. The expression of distance can be a digital output, whereby one revolution or a part thereof can be selected as the smallest increment, or alternatively distance can be reduced in an analog manner. The measurement of speed results from a simultaneous determination of time or by measurement of revolutions per minute. Multiplying force times distance and simmarizing i.e., integrating, gives a mechanical work. This may be done electronically or otherwise. Multiplying the force times speed or multiplying the force times distance and dividing by the time, electronically or in another way gives power. Distance is converted to digital form in an appropriate manner and the force for a distance of this type is taken as constant. The time interval for traveling one distance unit is best taken for determining the speed or the power if an electronic calculation is employed. Force, work, and power can be read in any arbitrary unit with a suitable calibration.

For the determination of force, i.e., traction in the transmission element, one or more rollers can be positioned on a spring-weighted lever, which deflects the transmission element as a consequence of the spring force. If one proceeds from a specific pressure force, the traction in the transmission element which is thus a function of the position of the pressure element results from the force parallelogram that is formed by traction and pressure forces.

Instead of positioning the roller on a spring-weighted lever, the roller can be drawn against the transmission element by a spring acting on the roller axis according to another embodiment of the invention, whereby the same deflection and/or flexure of the transmission elements results as when the roller is positioned on a lever.

In order not to change the degree of belt wrap of the transmission element on the wheels operating together with the transmission element or in order to improve reading accuracy for the deflection of the transmission element as a consequence of pressure force, in another embodiment of the invention, at least one supporting roller can be provided for the transmission element in the vicinity of the force element acting on the transmission element.

Another embodiment of the device according to the invention is characterized in that two rollers are positioned on the end of a lever and are attached on opposite sides of the transmission element, that the lever is positioned in a swivelling fashion onto a holder, that the holder is positioned in a swivelling fashion on the axis of one of the wheels joined by the transmission element, and that the holder is joined to the lever by a spring so that the rollers are pressed against the transmission element. It is possible herein to construct the spring either as a tension spring or as a pressure spring; this holds true for all of the embodiment forms. This embodiment, with the positioning of a holder onto the axis of one of the wheels which the transmission element is wrapped around has the advantage that, in this way, an attachment to a separate frame is eliminated.

The rollers can be positioned on the end of a two-arm lever, the arm length of which can vary so that the holder is flexibly joined between its ends. Variable lever lengths can compensate for the different distances between the two wheels between which the force transmission is produced via the force transmission element. Levers unequal in length permit an assembly outside the center of the free stringer of the transmission element with reproducible results for different distances between the wheels joined by the transmission element.

However, the lever can also be constructed as a one-arm lever with a variable lever length and can be linked to the holder by its one end, which holds one roller, while the free end provided with the other roller is spring-weighted.

Another variant according to the invention is characterized in that three rollers are arranged in a parallelogram frame, two of which lie on one side of the transmission element and the third which lies on the opposite side, that two joints of the parallelogram frame are joined together via a tension spring operating essentially perpendicularly to the transmission element, and that the parallelogram frame is held, with respect to the transmission element, onto a place thereof. Only a relatively free guiding of the parallelogram frame is required herein, which prevents it from travelling with the transmission element.

A simpler embodiment is produced in that two rollers are arranged on a parallelogram frame, one of which lies on one side of the tramsmission element and the other of which lies on the opposite side, that two joints of the parallelogram frame are joined together by a tension spring operating essentially perpendicular to the transmission element, and that the parallelogram frame is positioned by the free joint to the axis of one of the wheels joined by the transmission element. Of course, it is also possible to arrange the parallelogram frame rigidly onto the axis of one wheel, whereby it is then necessary that this attachment takes up the same forces which result from the action of the spring.

The use of a parallelogram frame between the axes of the wheels joined together by the transmission element is independent of the distance between these wheels, since the free extent of the transmission element is fixed. The use of the parallelogram frame in combination with the positioning on the axis of one wheel has, on the other hand, the advantage that one manages with one less roller and also, no additional guiding system is required for the parallelogram frame.

Of the many possibilities which exist for the arrangement of the force element with the roller for deflecting the transmission element, another preferred embodiment can also be mentioned which is that the supporting roller or rollers is/are arranged on a holder which holds the swivellable lever with the roller, which is attached to the transmission element from the side opposite that of the supporting roller or supporting rollers and is weighted by a spring, which joins the lever to the holder. Therefore the holder can either be arranged between the axes of the two wheels joined together by the transmission element and be guided loosely or the holder can be positioned on the axis of one of the wheels joined by the transmission element. The lever holding the roller can thus be positioned in a swivelling fashion on one end holding a supporting roller or on the end of the holder linked to the wheel axis.

Another modified embodiment according to the invention is characterized in that the lever holding the roller is positioned by means of a support arranged at one end of the holder and the roller is attached from the outside against the transmission link by the spring in such a way that the lever lies parallel to the transmission element with an average stressing of the transmission element. This embodiment has the advantage that deviations from the average loading cause slight angle modifications of the lever with the roller, whereby tangent and sine can even be assumed equal to the angle. If the roller weighted by the spring lies in the middle between two supporting rollers, simple approximation formulas result for the chain force. Since the holder for this lever can be positioned also on the axis of one of the wheels joined together by the transmission element, there results the advantage that in this case a separate attachment point for the holder is eliminated. This variant can be used without regard to the distance between the wheels.

The traction in the transmission element which will be determined is dependent on the roller position via the above-mentioned geometric relationship. This relationship can be approximated with any accuracy whatever depending on the required measurement precision either electronically, or it can be linearized by furnishing the factor $X_n$ in the multiplication part for a specific lever position "n." Thus a progressive approximation of the actual deflection/traction function can be obtained.

Another possibility according to the invention is that a variable capacitor or a potentiometer serves to determine the deflection of the force element.

It is also possible that magnetoresistors, i.e., photoresistors in combination with a relatively mobile magnetic field serve for determining the deflection of the force element. These photoresistors change their ohmic resistence with a change of an external magnetic field and thus give a signal at the applied voltage, which depends on the relative motion of the magnetoresistors with respect to the magnetic field. The lever with the roller can thus be furnished with a magnet or soft moving-iron instrument, while the magnetoresistors are rigidly attached, or vice versa.

It is also possible according to the invention that a wire strain gage be introduced on a positioning part of the roller which supplies a signal corresponding to the pressure force of the roller on the transmission element to determine the traction in the transmission element.

For the case of an electronic power determination the instantaneously indicated rpm or speed is multiplied by the instantaneous force; the work is obtained by multiplying a distance element with the average force for the respective distance element and subsequent integration, e.g., by storing in a capacitor or by counting with a pulse counter, i.e., the particular force is multiplied by a specific constant factor and these values are summed up, whereby the value 1 can be used for the constant factor which expresses the distance element.

A device is provided for the electronic power determination which is characterized by a differential amplifier, which amplifies a signal produced, dependent on the angularity of the lever holding the roller; a voltage-controlled oscillator, which is connected at the outlet side of the differential amplifier and which converts the amplified signal analogous to the force of the transmission into square pulses, whereby the frequency is proportional to the force of the transmission element; a flip-flop monostable multivibrator which converts to square pulses of uniform length the switch pulses dependent on the distance of the transmission element; and by an electronic circuit breaker, which combines the two square pulses of the voltage-controlled oscillator and of the flip-flop multivibrator to form pulse packs with variable frequency, which can be read as power directly on the indicator after a differentiation in a detector amplifier and are a measurement for the total work via pulse counting in a pulse counter, whereby a frequency divider is connected in series to the pulse counter, which reduces the number of square pulses per pulse via a programmable dividing ratio, and this signal is fed to the pulse counter via a relay driver.

If the transmission element can be shifted sideways, as is the case for bicycle chains, which run via shifting gears, the force element can be shifted sideways perpendicular to this element so as not to limit the measurement process to a specific chain guide system.

a particularly favorable application possibility for the present invention consists in measuring the power and energy of bicyclists, whereby the transmission element, in this case the bicycle chain, is deflected by a force element. The advantage of such a device attached to regular bicycles is that all medically indicated and athletic purposes for which conventional, stationary testing devices and home trainers are built will be completely fulfilled, and that the regular bicycle in normal operation can be used without destroying the work expended on a braking gear in an enclosed space. The cyclist can thus use the bicycle for transport and for leisure time enjoyment and is not limited to staying in one place. Since the device can be built into any commercial bicycle without changes, one obtains training, fitness, rehabilitation, or medical apparatus which can be used in fresh air and according to one's own schedule following a physician's or a trainer's instruction at relatively low cost. The apparatus can also be mounted on stationary home training and physical fitness devices, whereby there is also the possibility for measuring power and energy. Such devices offer in simpler embodiments a speed and relative resistance indicator, whereby their field of application can essentially be expanded.

The device according to the invention can also be used for motor driven vehicles with a flexible transmission system, such as for example, in a motorcycle, motorbicycle, motorized bicycle, etc., which have a chain for the transmission of motor power to the rear wheel. A logical ratio between speed and power can be found via continuous measurement and thus also the influence on fuel consumption can be obtained.

Other objects, features and advantages of the invention will be apparent from the following detailed description of preferred embodiments of its practice taken in connection with the accompanying drawings, in which:

BRIEF DESCRIPTION OF THE DRAWING

FIGS. 1-2 show two positions of operation of a first such embodiment, FIGS. 3-6 show four modifications of such first embodiment, FIGS. 7-7a show another two mirror image versions of a second such embodiment;

FIGS. 8-8a show two mirror image versions of further modified forms of said second embodiment;

FIGS. 9-10 show two mirror image versions of further modified forms of said second embodiment;

FIGS. 11-11c show a third embodiment;

FIGS. 12-12a show a fourth embodiment; and

DETAILED DESCRIPTION OF PREFERRED EMBODIMENTS

Figure 1:
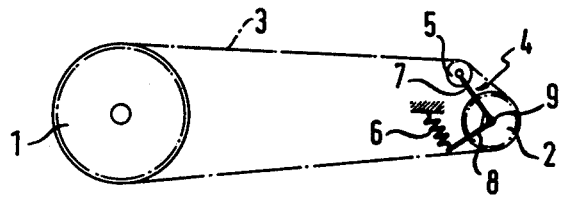
FIGS. 1-12 are mechanical schematic diagrams of different preferred embodiments of the mechanical section of the device according to the invention in different operating positions and and in which more particularly.

As can be seen from FIGS. 1-12, two wheels 1 and 2, which can be, for example, chain wheels, are wrapped partly by a transmission element 3, which can be, for example, a chain, as is the case in this arrangement in a bicycle.

In order to determine the traction, which is transmitted by the transmission element from one wheel to the other, force element 4 is provided, which has a roller 5, which—as is shown—is pressed or drawn against the transmission element by a spring 6 in order to deflect it from its normal course between the two wheels. The degree of deflection of the transmission element is a measurement for the traction which is transmitted by the transmission element.

Figure 2:
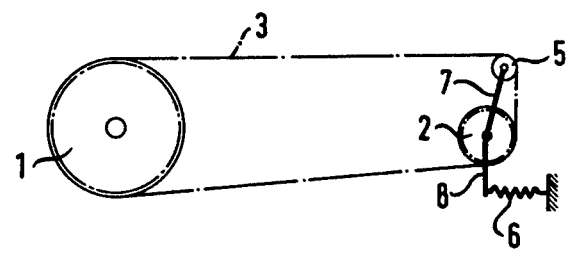

FIGS. 1 and 2 show an embodiment in which roller 5 is positioned on a lever arm 7, which is joined rigidly to another lever arm 8 on which a spring 6 operates. In the case shown, this spring is a compressive spring; however, it is also possible, by using a suitable arrangement, to employ a tension spring. Alternatively, a helical spring can be employed. The link defined by lever arms 7 and 8 pivots around an axis 9, which in the FIG. 1-2 embodiment may coincide with the axis of wheel 2. The transmission element 3 is made somewhat longer than would be necessary without measurement according to this embodiment of the invention. The angular deflection of lever arm 7 by spring bias against the traction of chain 3 is a measurement for the force transmitted by transmission element 3, since lever arm 7 is increasingly swung around axis 9 with increasing force by spring 6. Force element 4 or lever arms 7 or 8 can be joined to a variable capacitor or a potentiometer, which shows electronically the dependence of deflection on traction.

Figure 4:
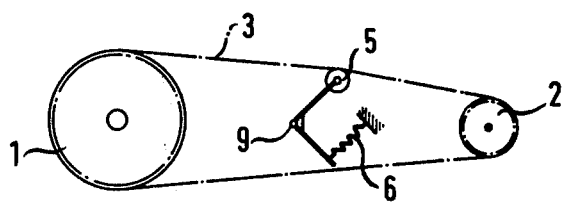

In the embodiment according to FIG. 4, which differs from that shown in FIGS. 1-2 essentially by the fact that the swivelling axis 9 of combined lever arms 7 and 8 does not coincide with the axis of wheel 2, transmission element 3 is not changed in length from the length necessary for the wrapping of wheels 1 and 2 so that a relatively small deflection results through roller 5, which is pressed by the force of spring 6 against transmission element 3.

Figure 3:
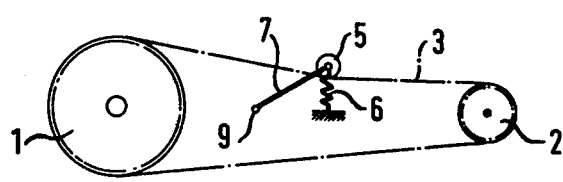

While roller 5 is pressed from the inside against transmission element 3 in the embodiments according to FIGS. 1 and 2 as well as 4, in the embodiment according to FIG. 3 roller 5 positioned on a lever arm 7 is drawn from the outside against transmission element 3 by a spring 6, whereby spring 6 acts on the end of lever arm 7 turned to roller 5, which is positioned in a swivelling manner around axis 9. The second lever arm 8 is not necessary in this embodiment.

Figure 5:
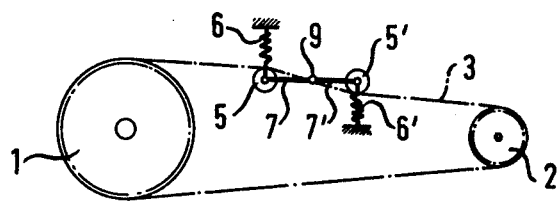
Figure 6:
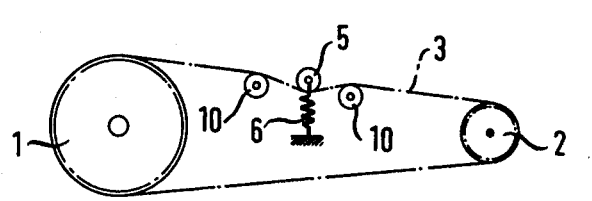

Two rollers 5 and 5' are provided in the embodiment according to FIG. 5, which are positioned in a rotating fashion at the ends of lever arms 7 and 7' of a two-arm lever, which is positioned in a swivelling fashion around an axis 9 in the plane of transmission element 3. Rollers 5 and 5' thus act reciprocally, i.e., in one case from the inside, and in the other, from the outside, on transmission element 3, whereby this element is undulatingly deflected from its original course. Springs 6 and 6' are used to press rollers 5 and 5', which springs act on the ends of lever arms 7 and 7' and operate in the case shown as tension springs. Of course, the springs can also be formed in this case by another arrangement with pressure springs or helical springs. Different distances between wheels 1 and 2 can be compensated for by different lever arms 7, 7', since a specific force in the transmission element corresponds to a specific angularity, independent of the distance between wheels 1 and 2. Therefore the device can be built onto for any vehicle, without having to modify the calibration.

In the embodiment according to FIG. 6 a roller 5 is again provided, which is drawn against transmission element 3 by a tension spring 6. The particular feature of this embodiment is that supporting rollers 10 are provided at a certain distance, on both sides of roller 5, which rollers support transmission element 3. Of course, tension spring 6 here can also be replaced by a pressure spring arranged on the opposite side. It results from the arrangement shown that the free part of the transmission element is always the same, independent of the distance between wheels 1 and 2, whereupon the possibility again exists of using the device for any vehicle without a recalibration being made necessary.

Figure 7:
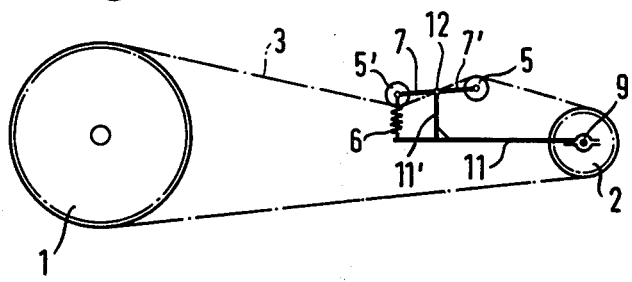
Figure 7A:
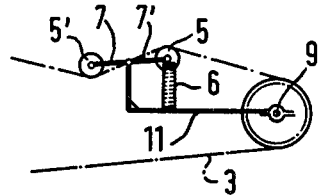

A device is presented in FIGS. 7 and 7a in which a two-arm lever 7, 7' holds rollers, 5, 5' on its ends and is positioned in a swivelling fashion on a holder 11, whereby the swivelling axis 12 of the two-arm lever 7, 7' lies on a support 11' joined rigidly to lever 11. A spring 6, which is constructed in the case of FIG. 7 as a tension spring, and in the case of FIG. 7a, as a pressure spring seeks to deviate the two-arm lever 7, 7' opposite holder 11' and thus to deflect transmission element 3 from its natural course. Holder 11 is positioned in a swivelling fashion on axis 9 of wheel 2. The embodiments according to FIGS. 7 and 7a are mirror images of each other. Variable lever lengths of lever arms 7 and 7' can compensate for the different distances between wheels 1 and 2. Levers of unequal length permit a mounting outside the center of the free piece of transmission element 3 with reproducible results for different distances between wheels 1 and 2.

Figure 8:
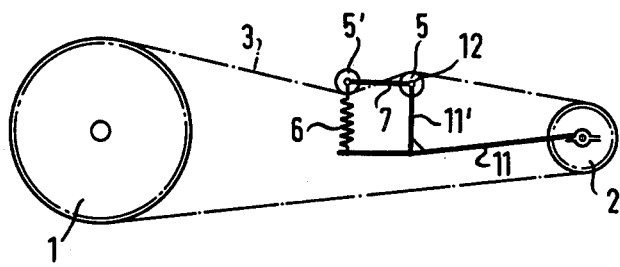
Figure 8A:
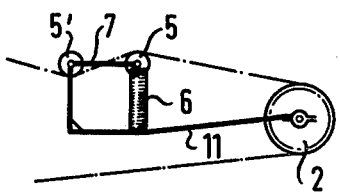

FIGS. 8 and 8a, which form mirror images, correspond to the embodiments according to FIGS. 7 and 7a with respect to the positioning of holder 11. Rollers 5, 5' are, however, positioned in a revolving fashion on a one-arm lever 7 and deflect transmission element 3 in the same way as in FIG. 7 or 7a. The one end of lever 7 is joined to support 11' of holder 11 by a hinge 12, which holder is positioned in a swivelling fashion around axis 9 of wheel 2. This embodiment produces simpler force ratios for determining the traction dependent on the angle.

Figure 9:
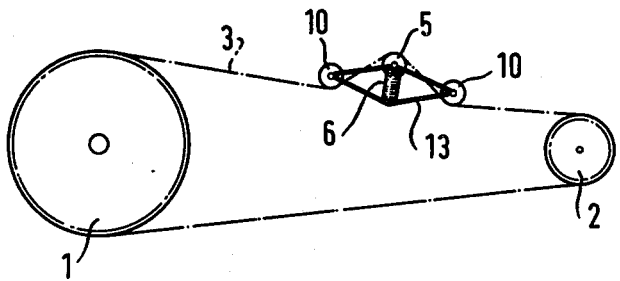
Figure 10:
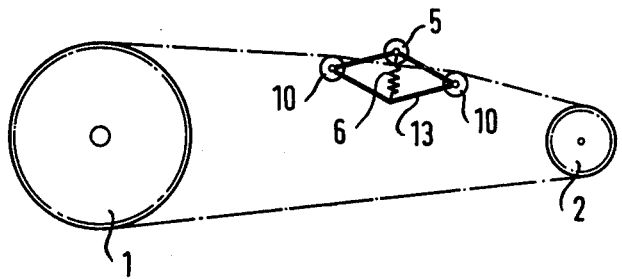

In the embodiments according to FIGS. 9 and 10, which are arranged as mirror images of each other, a parallellogram frame 13 is provided which is fitted with rollers at three joints, whereby the two outer rollers serve as supporting rollers 10, while the middle roller 5 causes the deflection of transmission element 3. The joint holding roller 5 is joined to the free joint via a spring 6, which is constructed in the case of FIG. 9 as a pressure spring and in the case of FIG. 10 as a tension spring. The parallogram frame 13 is held loosely by a guiding unit, not shown, so that it will not travel with transmission element 3. The free extent of the transmission element is fixed, whereby the device can be used independent of the distance between wheels 1 and 2.

Figure 10A:
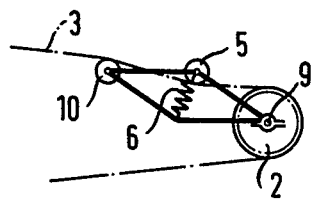

The embodiment according to FIG. 10a also comprises a parallelogram frame 13, which, however, only has one roller 5 and a counter-roller or supporting roller 10 and is positioned in a swivelling fashion with one joint on axis 9 of wheel 2. The arrangement of tension spring 6 corresponds to that in the embodiment according to FIG. 10.

Figure 11:
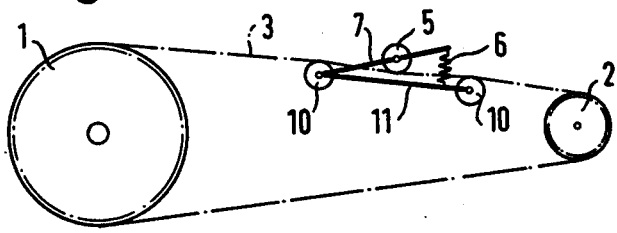
Figure 11A:
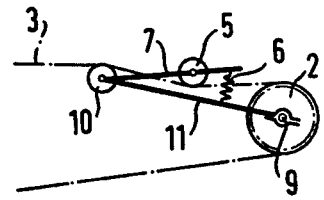
Figure 11B:
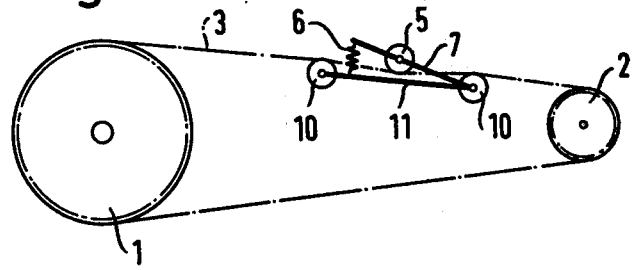
Figure 11C:
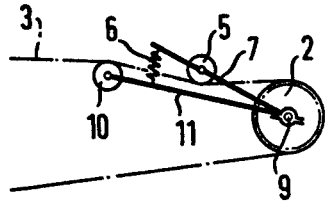

In the embodiment according to FIGS. 11–11c, a holder 11 is provided, on one end of which a lever 7 for roller 5 is positioned in a swivelling fashion. Holder 11 is joined to lever 7 by a tension spring 6, whereby roller 5 is drawn against transmission element 3. The absorption of the counter force arising hereby is handled in the case of the embodiments according to FIGS. 11 and 11b by two supporting rollers 10, which are provided at both ends of holder 11. In these embodiments, holder 11 is maintained on a frame, not shown, so that it will not travel with transmission element 3. In the embodiments according to FIGS. 11a and 11c, which are formed like FIGS. 11 and 11b as mirror images with respect to the arrangement of lever 7, holder 11 is positioned in a swivelling fashion on axis 9 of wheel 2 so that holder 11 displays only a counter or supporting roller 10.

Figure 12:
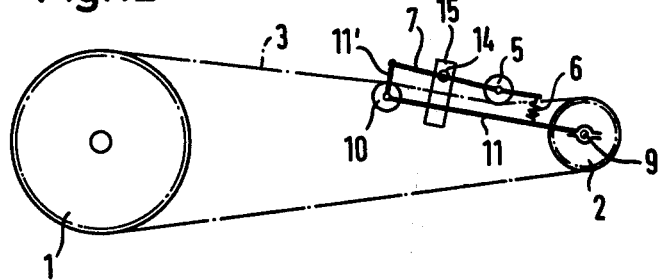
Figure 12A:
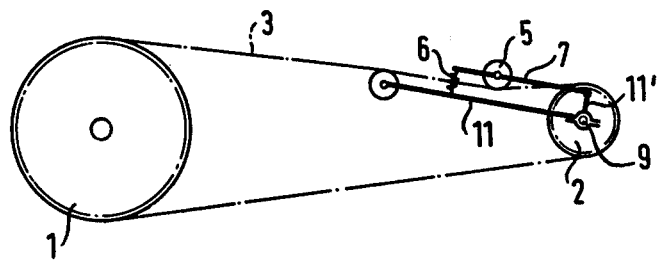

In the embodiment according to FIGS. 12 and 12a, the lever 7 holding roller 5 is positioned in a swivelling manner on a support 11' of a holder 11, which can be swung around axis 9 of wheel 2. Holder 11 holds a supporting roller 10 and is joined to lever 7 by a tension spring in such a way that the transmission element can travel through rollers 5 and 10 and it is deflected from its natural course. The arrangement is thus one in which lever 7 runs essentially parallel to transmission element 3 with an average load on this element. Differences which are higher or lower cause only small changes in the angle, wherefore the tangent and the sine can be taken equal to the angle. If roller 5 lies in the center between supporting roller 10 and wheel 2, simple approximation formulas result for the chain force. Tension or pressure springs can act on lever 7 and holder 11 in any arrangement in order to press roller 5 and supporting roller 10 against transmission element 3. However, since the positioning on axis 9 can be replaced by a rigid attachment in the above-described embodiments, the stress arising by the spring force must then be taken up.

Figure 13:
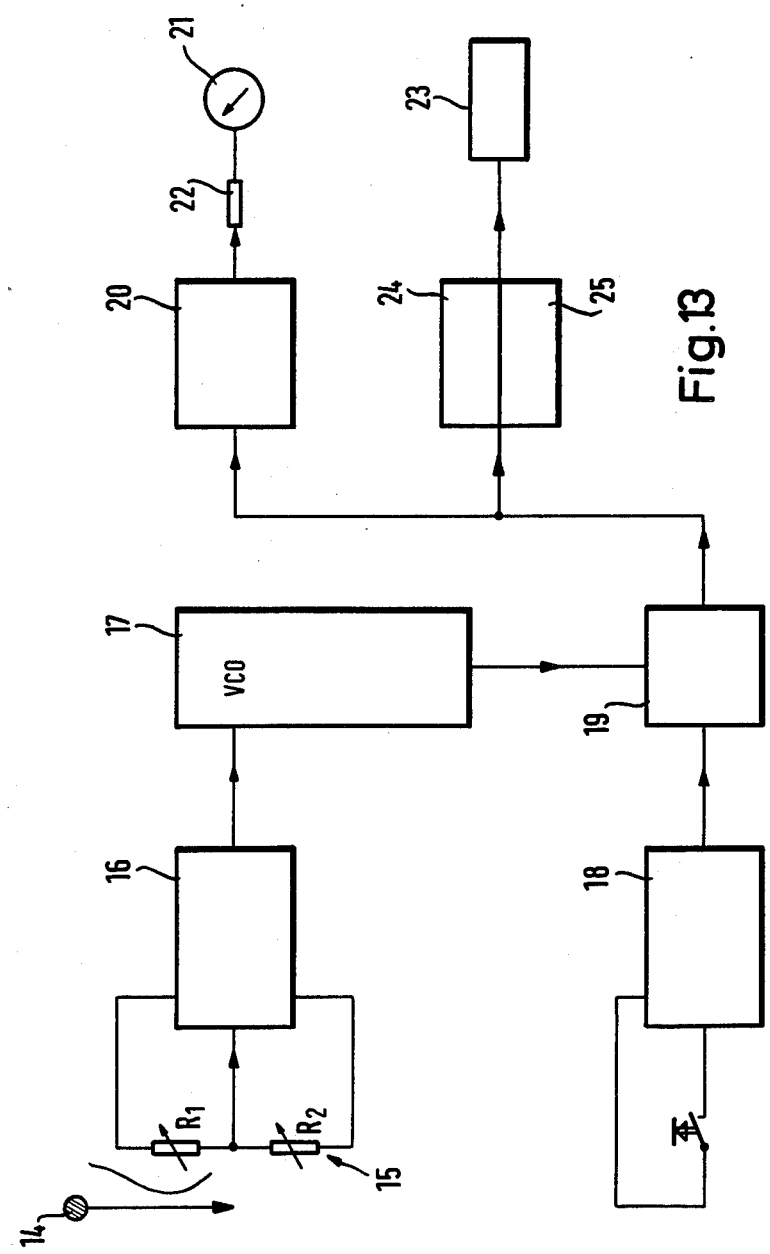
FIG. 13 shows the electronic section of the apparatus usable with any of the FIG. 1-12 or other embodiments of the invention for the measurement of mechanical energy and power.

A moving-iron instrument or permanent magnet 14 is arranged on the lever for transmitting the angle position of lever 7, while holder 11 holds a differential magnetorisistor, i.e., a photoresistor 15. A microswitch is provided on roller 5 or roller 10, which switches on once or several times per rotation. A certain pair of resistances $R_1$, $R_2$ result according to lever position or a voltage difference arises at an applied voltage, which is a measurement for the angle position. This voltage is amplified in a differential amplifier 16 shown in FIG. 13. The moving iron instrument 14 which is moved relative to magnetoresistors 15 can be formed such that the voltage signal at any angle position is analogous to the functional course of the factor: angle of lever 7 to holder 11 and the factor: chain force. Thus a signal proportional to the chain force is obtained from differential amplifier 16. This signal is converted to a square wave in a voltage-controlled oscillator 17, whereby the frequency is now proportional to the chain force. If a permanent magnet is used instead of the moving-iron instrument, then the function is approximated perpendicular to the face of the plane by a suitable guiding of the magnet. The distance is measured by a microswitch such that it switches on a contact one or more times with each rotation of roller 5 or 10. This switch pulse is transformed to a pulse of uniform length in a flip-flop multivibrator 18. Both signals can be coupled by an electronic circuit breaker 19 such that a series of pulse packs arise at its output, all of which have the same length, but are composed of many different individual square pulses. Each pulse pack corresponds to a distance element, the number of pulses contained in the occurring chain force, or the force in transmission element 3. The pulses are differentiated in a detector amplifier 20, i.e., are converted to square pulses of equal length and are shown amplified on an indicator 21. The reading is proportional to the number of incoming square pulses per unit of time, no matter which pulse pack (18, 17) they come from. The reading is thus a direct measurement for the power transmitted instantaneously by transmission element 3. The indicator 21 is greatly attenuated to prevent too much of a jerky deflection. A resistor 22 is connected in series for gaging and calibrating. Energy integration is produced by a pulse counter 23, whereby the number of square pulses per pulse pack is first reduced by a programmable dividing ratio X via a frequency divider 24. Thus each Xth square pulse is translated by one on the counting device. The electronic calibrations are made by adjusting the moving-iron instrument or magnet 14 and the differential magnetoresistors with respect to each other so that the output signal is O in a lever position in which the transmission member is not loaded and transmits no force. Calibration is also possible by adjusting the pulse width from flip-flop multivibrator 18, by adjusting the dividing ratio in frequency divider 24, and the amplification in detector amplifier 20.

To recapitulate, 14 is a magnet or other moving-iron instrument; 15 is differential magnetoresistors; 16 is magneto-resistor-differential amplifier; 17 is voltage-controlled oscillator; 18 is a microswitch for picking up the rpm; 18 is a flip-flop multivibrator; 19 is an electronic circuit breaker; 20 is a detector amplifier; 21 is an indicator; 23 is a pulse counter; 24 is a frequency divider; 25 is a relay driver.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Apparatus for the measurement of mechanical work and performance transmitted by means of a flexible transmission element between two guide wheels, including:
   (a) a first roller, said first roller being placed under a load, acting on one side of said transmission element and deflecting said transmission element in accordance with said load and with the traction in the transmission element;
   (b) a second roller acting on the other side of said transmission element;
   (c) a first device for measuring the deflection of said first roller and for producing a corresponding first signal;
   (d) a second device for measuring the distance covered by said transmission member and its speed of travel, and for producing a corresponding second signal;
   (e) one of the group of elements comprising said guide wheels and rollers comprising a sensor;
   (f) a third device controlled by said first and second signals for producing a third signal corresponding to the said mechanical work and performance;
   (g) said first and second rollers being supported on a structure which is swingably supported on the axis of one of said guide wheels and
   wherein said structure includes a holder swingably positioned on the axis of one of the guide wheels joined by the transmission element, and a lever swingably positioned on the holder, at least one said roller being positioned on said lever.

2. Apparatus according to claim 1, wherein the lever is one-armed and has a said roller positioned adjacent its free end.

3. Apparatus according to claim 1, wherein the lever is two-armed and has a said roller positioned adjacent each of its free ends.

4. Apparatus according to claim 1, wherein said structure includes a support positioned on the axis of one of the wheels, said support carrying one said roller adjacent its free end, and a one-armed lever positioned on the axis of said one wheel and carrying the other said roller adjacent its free end.

5. Apparatus according to claim 1, wherein the length of at least one arm of the lever is adjustable.

6. Apparatus for the measurement of mechanical work and performance transmitted by means of a flexible transmission element between two guide wheels, including:
   (a) a first roller, said first roller being placed under a load, acting on one side of said transmission element and deflecting said transmission element in accordance with said load and with the traction in the transmission element;
   (b) a second roller acting on the other side of said transmission element;
   (c) a first device for measuring the deflection of said first roller and for producing a corresponding first signal;
   (d) a second device for measuring the distance covered by said transmission member and its speed of travel, and for producing a corresponding second signal;
   (e) one of the group of elements comprising said guide wheels and rollers comprising a sensor;
   (f) a third device controlled by said first and second signals for producing a third signal corresponding to the said mechanical work and performance;
   (g) said first and second rollers being supported on a structure which is swingably supported on the axis of one of said guide wheels and
   wherein said structure includes a holder swingably positioned on the axis of one of the guide wheels joined by the transmission element, and a lever swingably positioned on the holder, at least one said roller being positioned on said lever and wherein said structure comprises a parallelogram frame, a first one of the joints of the parallelogram frame being positioned on the axis of one of said wheels, a second joint of the parallelogram frame opposite the joint positioned on the axis of one of said wheels carrying a first roller and a further intervening joint of the parallelogram frame carrying a second roller.

* * * * *